United States Patent [19]
McIntyre

[11] Patent Number: 5,268,787
[45] Date of Patent: Dec. 7, 1993

[54] MULTIPLE-PASS METHOD AND APPARATUS FOR LASER AMPLIFICATION

[75] Inventor: Iain A. McIntyre, Vista, Calif.

[73] Assignee: Energy Compression Research Corp., San Diego, Calif.

[21] Appl. No.: 18,419

[22] Filed: Feb. 17, 1993

[51] Int. Cl.$^5$ .............................................. H01S 3/00
[52] U.S. Cl. .................................................. 359/347
[58] Field of Search ............................ 359/347, 348, 349

[56] References Cited

U.S. PATENT DOCUMENTS

| | | | |
|---|---|---|---|
| 4,001,705 | 1/1977 | Sinclair et al. ................ | 359/347 X |
| 4,019,151 | 4/1977 | Brueckner et al. ............. | 330/4.3 |
| 4,872,181 | 10/1989 | Johnson et al. ............... | 372/106 |
| 4,935,932 | 6/1990 | Johnson et al. ............... | 372/33 |
| 4,941,738 | 7/1990 | Olsson ............................ | 359/347 X |
| 5,048,030 | 9/1991 | Hiiro .............................. | 359/349 X |
| 5,172,263 | 12/1992 | Hale ............................... | 359/347 |

OTHER PUBLICATIONS

Lowdermilk & Murray; The Multipass Amplifier: Theory And Numerical Analysis; May 1980; J. Appl. Phys. 51(5), pp. 2436–2444.

Murray & Lowdermilk; ND:YAG Regenerative Amplifier; Jul. 1980; J. Appl. Phys. 51(7); pp. 3548–3555.

*Primary Examiner*—Mark Hellner
*Attorney, Agent, or Firm*—Marks & Murase

[57] ABSTRACT

A method and apparatus for increasing the energy extraction efficiency from laser amplifiers by passing a laser signal through the amplifier multiple times in a collinear geometry without need to use active optical switching components. The invention uses a non-reciprocal optical element which affects (e.g., rotates the polarization of) a light beam differently depending on which direction the beam passes through the optical element. In a preferred embodiment, the method and apparatus employs a Faraday rotator as the direction-dependent light beam rotating device.

65 Claims, 10 Drawing Sheets

MULTIPLE-PASS METHOD AND APPARATUS FOR LASER AMPLIFICATION

BACKGROUND OF THE INVENTION

1. Field of the Invention

The present invention relates to a multiple-pass laser amplifier system, and more particularly to a method and apparatus for efficiently amplifying light. The present invention further relates to a method and structure for passing a beam of light through an optical component, such as a laser amplifier, multiple (at least four) times in a collinear fashion without using active optical switching.

2. Background

Figure 1:
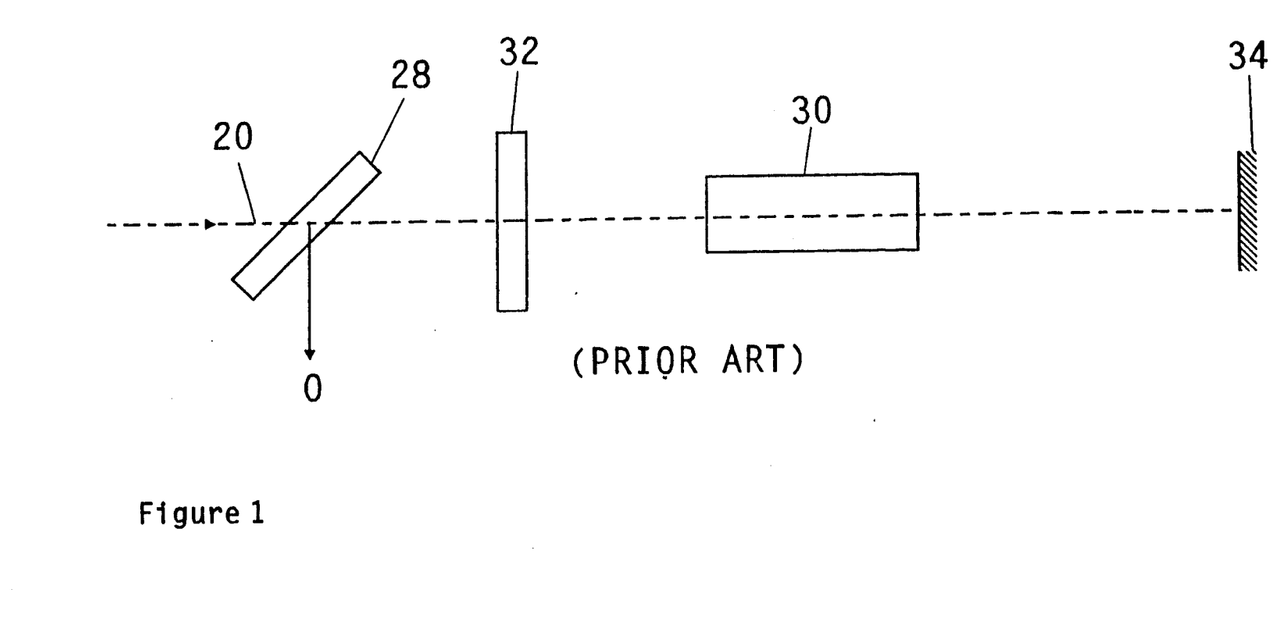
FIG. 1 is an optical circuit diagram of a conventional technique for double passing a light beam through an optical element.

Laser systems of the oscillator/amplifier type, i.e., a laser oscillator which generates a laser pulse which is then amplified to the desired energy level in one or more amplifier units, are known. Where the signal entering the amplifier is small, the problem of efficient energy extraction can be significant. Amplification of small laser signals can be performed by a linear chain of amplifier units; however, the energy extraction efficiency of such a system is low, since saturation of the laser gain typically only occurs in the last amplification unit. Energy extraction efficiency may be improved by passing the laser beam twice through each amplifier stage, using a double-pass collinear geometry where a polarizer and quarter-wave retardation plate are used to separate the reflected beam from the incoming beam. Such a system generally employs a polarizer and quarter-wave plate arranged as shown in FIG. 1. Assuming the beam incoming to the polarizer from the left is plane polarized, with the plane of polarization such that the beam is passed by the polarizing element, then the beam passes through the quarter-wave plate, which is adjusted in such a way as to convert the polarization of the laser beam to be circular. The beam then passes through the amplifier, reflects off the mirror, passes through the amplifier for a second time and is incident on the wave plate for a second time. The rotation of the polarization vectors of the incoming beam is such that the beam passes out the wave plate with plane polarization in a direction orthogonal to the polarization of the original beam. This geometry allows collinear multiple passing of the amplifier but is limited to only two passes. Also see Brueckner, et al., U.S. Pat. No. 4,019,151, which use a double pass collinear geometry plus a delayed time sequence for more efficient amplification.

An alternative system, which includes multiple passing of a beam through an amplifier unit in order to increase the energy extraction efficiency, is the use of a regenerative amplifier, where the laser amplifier is placed within an optical cavity and the optical signal to be amplified is switched into the cavity by an active control means, and maintained within the cavity until such time as the desired energy level is attained at which point the signal is switched out of the cavity, for example, by a Pockels cell. See, for example, W. H. Lowdermilk, et al., *The Multipass Amplifier: Theory And Numerical Analysis*, J.Appl. Phys. 51(5), May 1980, and J.E. Murray, et al., *ND:YAG Regenerative Amplifier*, J.Appl. Phys. 51(7), Jul. 1980. The regenerative amplifier has the advantage over the oscillator/amplifier designs in that only one amplifier stage is required to bring the signal to a saturation level. On the other hand, the regenerative amplifier requires active optical switching to trap the pulse within the optical cavity and to dump the signal from the cavity. Additionally, the length of the regenerative amplifier cavity is set by the duration of the laser pulse to be amplified and the speed of the active optical switches. The minimum length of the regenerative amplifier cavity is limited to being greater than half of the length of the optical signal plus the optical length associated with the activation time of the optical switching.

SUMMARY OF THE INVENTION

Objects

It is an object of the present invention to provide a method and apparatus for increasing the effective gain and energy extraction from laser amplifiers operating in a collinear geometry.

It is a further object of the present invention to provide a method and apparatus for increasing the effective gain and energy extraction from laser amplifiers operating in a collinear geometry, while avoiding the use of active optical switches and the size limitations of regenerative amplifiers.

It is a further object of the present invention to provide a passive multiple-pass collinear laser gain system which is applicable to rod, disc, slab and other types of optical amplifiers.

Another object of the present invention is to provide a method and apparatus for multiple collinear passing of a laser amplifier with a laser beam.

It is yet another object of the present invention to provide a method and apparatus for passing a beam of light through an optical component at least four times in a collinear geometry.

It is a further object of the present invention to provide a method and apparatus for achieving amplification with a multiple-pass collinear system using a non-reciprocal optical element or element grouping.

Other objects and features of the present invention will be apparent in the following description and claims in which are set forth the principles of operation of the invention with the best modes presently contemplated for the use and practice of the invention.

To achieve the foregoing and other objects, and in accordance with the purpose of the present invention, as embodied and broadly described herein, the method of multiple passing of a beam through an optical amplifier according to the present of this invention may comprise the steps of directing a laser beam incident from a first direction at a non-reciprocal optical device, such as Faraday rotator, which is advantageously coupled with a reciprocal optical device, such as a half-wave retardation plate (collectively forming a non-reciprocal optical grouping), both on a first optical axis. The beam is directed through the non-reciprocal optical grouping and into an optical amplifier having a second optical axis which may be the same as or at an angle, e.g., orthogonal, to the first optical axis and which preferably includes a non-reciprocal optical device which may advantageously be in the form of a reflecting mirror and a quarter-wave retardation plate, both positioned on the second optical axis, whereby the beam is reflected back through the optical amplifier device along the second optical axis. The reflected beam is then separated from the beam incident on the optical amplifier device using, for example, a polarizer. The reflected, separated beam is then retro-reflected back along the second optical axis, whereby the beam passes back through the optical amplifier for a third pass to the reflecting mirror, whereby the beam is again reflected back along the second optical axis through the optical amplifier for a fourth pass and then directly through the non-reciprocal optical grouping. After four passes, an amplified beam is output, using, for example, a polarizer; the direction of the amplified output beam being generally non-collinear with respect to the direction of the incident beam. The incident laser beam may be collinear with the optical axis or at an angle, e.g., orthogonal, with respect to the first optical axis. The optical axis may be collinear with or at an angle to, e.g., orthogonal, the optical axis of the optical amplifier, depending on the orientation of the polarizers used and the plane of polarization of the incident laser beam. The reflecting mirror, or mirrors, may be in the form of a non-linear mirror.

In another aspect of the method, at least four passes of the beam are made through each of two or more optical amplifiers, and in yet another aspect of the invention, a method is provided for multiple four-pass passes of a single optical amplifier.

In another aspect of the invention, there is provided a multi-pass apparatus for amplifying an incident beam of light. The apparatus comprises a double pass optical amplification arm, which includes an optical amplifier positioned on a first optical axis (previously referred to in connection with the above-described method as a second optical axis), and an optical element, preferably a polarizer and a reflecting device for separating the beam which has been double passed through an optical amplifier from an incident beam, and for retro-reflecting the double-passed beam back to the double pass optical amplification device, whereby a beam propagating along the first optical axis is collinearly passed through the optical amplifier four times.

A non-reciprocal (polarization rotating) optical grouping having a non-reciprocal polarization rotating element, such as, for example, a Faraday rotator, is positioned on a second optical axis (previously referred to in connection with the above-described method as a first optical axis). An optical element, such as a polarizer, may be used for separating the four-pass amplified beam from the incident beam so that the amplified beam may be conveniently output.

The first optical axis may be collinear with, or at an angle, e.g., orthogonal, to the second optical axis.

The non-reciprocal optical grouping may further comprise a reciprocal optical device, such as a half-wave retardation plate.

The apparatus may preferably further comprise a second double pass optical amplification grouping including a second optical amplifier positioned on a third optical axis and a second non-reciprocal polarization rotating grouping, oriented to receive and reflect a beam reflected from the first non-reciprocal polarization altering device so that a beam, after passing collinearly two times through the first double pass optical amplification arm, is directed back to the second double pass optical amplification arm. In that regard, the device for retro-reflecting a double-passed beam also retro-reflects the beam from the second double pass optical amplification arm back along the third axis so that the optical beam traverses the second optical amplifier four times.

In another embodiment, the apparatus may include a reflecting structure, preferably in the form of a series of mirrors, for directing a beam through the double pass amplification arm along a fifth optical axis, and a second non-reciprocal polarization rotating grouping oriented to receive and reflect a beam reflected from the first non-reciprocal polarization altering grouping, whereby a beam, after passing collinearly twice through the double pass optical amplification arm, is redirected back to the double pass optical amplification arm for another double pass. Preferably, the fifth optical axis and the second optical axis are not collinear or parallel to each other.

BRIEF DESCRIPTION OF THE DRAWINGS

The accompanying drawings, which are incorporated in and form a part of the specification, illustrate various embodiments of the present invention and, together with the description, serve to explain the principles of the invention. In the various FIGURES, similar components have been identified with corresponding reference numerals.

In the drawings.

DETAILED DESCRIPTION OF THE INVENTION

The plane of incidence of a light beam is the plane in space which is defined by the axis of the incident and reflected beams when the light beam is incident on an optical surface.

It is known that the electric vector of a light beam can be described in terms of its two orthogonal linear components, the p component, whose electric vector lies parallel to the plane of incidence, and the s component, whose electric vector lies perpendicular to the plane of incidence. According to the electromagnetic theory of light, the electric and magnetic vectors are mutually perpendicular.

The present invention utilizes the different behavior of various optical components under illumination by beams of light with different polarization. These components include polarizers, half-wave and quarter-wave retardation plates, and Faraday rotators. The operation of each of these components is briefly described.

Polarizers are used to resolve beams of light into their two polarization components. Polarizers made according to available designs will transmit the p component and reflect the s component of light. Polarizers exhibiting p transmission and s reflectance in excess of 98% are presently available. However, it should be appreciated that polarizers of lower efficiency can be used to practice the invention. A polarizer is a reciprocal device; in other words, it can be used in reverse to combine orthogonally polarized beams of light.

Retardation plates are employed to change the nature of the polarized light beam. The form of retardation plate known as a "half-wave plate" rotates the polarization vector of a linearly polarized beam by up to + or −90°, depending on its orientation relative to the polarization vector of the incoming beam. Quarter-wave plates, on the other hand, will convert a linearly polarized beam into an elliptically or circularly polarized beam, again depending on the relative orientation of the plate and the beam. For any particular birefringement material, the degree of retardation (achieved by a half or quarter-wave plate) depends on the plate thickness. Like the polarizer, retardation plates are reciprocal devices. When the beam is returned through the same plate in the opposite direction, the plane of polarization will be rotated back to its original orientation.

A Faraday rotator is a non-reciprocal polarization rotating element. A beam passing through the Faraday rotator in one direction will have its polarization vector rotated through a specific angle in a certain direction. When the beam is returned through the Faraday rotator, the polarization vector will be further rotated in the same direction and through the same angle.

For example, a beam passing through a 45° retarder plate will have its polarization vector rotated through an angle of 45° from its original position and when the same beam is reflected back through the plate, its polarization vector will be rotated in the reverse direction through the same 45° angle; in other words, the polarization vector of the beam will return to its original position. In the case of a 45° Faraday rotator, the polarization vector of the beam will be rotated through an angle of 45° in the first pass and, on the return pass, rotated through a further 45° angle (in the same direction), such that the resultant polarization vector will be at 90° from its original orientation.

A further example of a non-reciprocal optical element or element grouping is a quarter-wave plate operating in conjunction with a mirror. A linearly polarized beam on passing through the plate becomes circularly polarized. On reflection, the right or left handedness of the circular polarization is flipped, either from right to left, or vice versa. Thus the polarization of the reflected beam is no longer the same as that produced by the retardation plate alone. When passing a beam of light through a quarter-wave plate in conjunction with a mirror, the second (or reflected) pass through the quarter-wave plate can, if the quarter-wave plate is properly oriented, produce a beam which is linearly polarized at 90° to its original orientation.

Figure 2A:
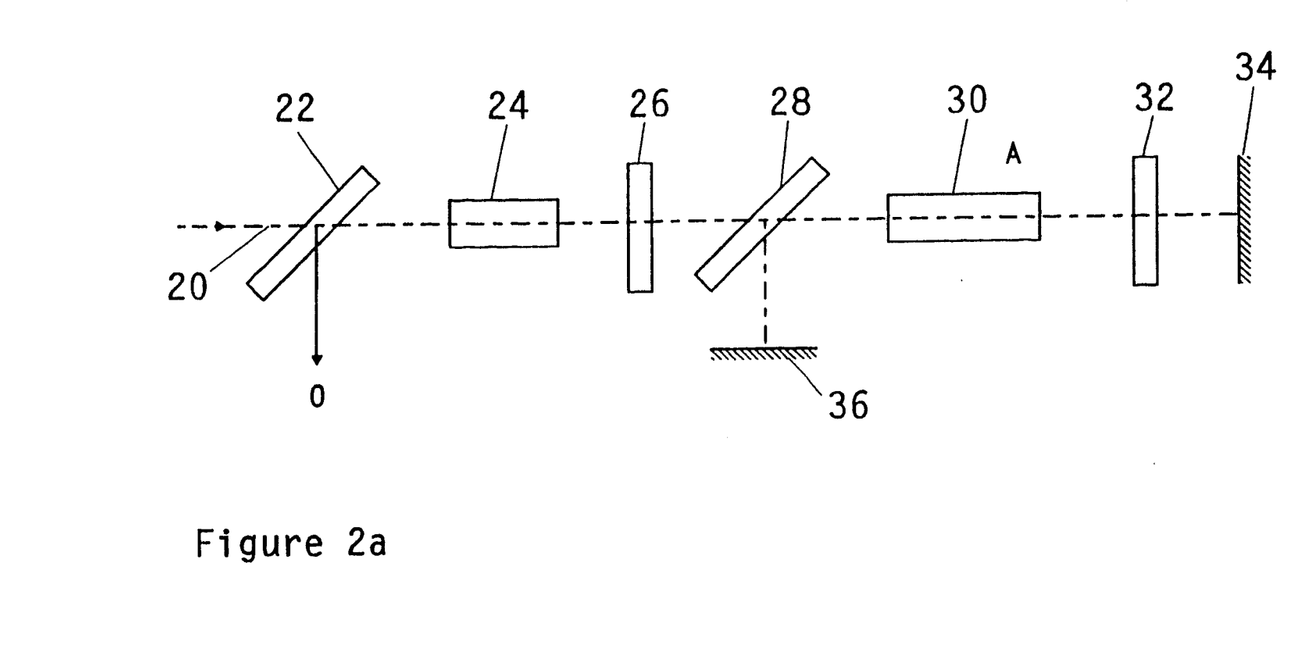
FIGS. 2a-2e are optical circuit diagrams of a series of embodiments of the invention in which the light beam passes through the amplifier four times.

The embodiment of the invention shown in FIG. 2a illustrates a method and apparatus for employing a conventional double pass optical system twice, resulting in four collinear passes of the amplifier. The laser beam lies on the optical axis 20 and, in the illustrated example, is p polarized. The beam is transmitted through a non-reciprocal optical grouping which includes a polarizer 22, a Faraday rotator 24, and a half-wave retardation plate 26. In the configuration of FIG. 2a, the half-wave retardation plate 26 and the Faraday rotator 24 are oriented such that the rotation of the polarization vector caused by one component is opposite but equal to the rotation of the polarization vector caused by the other. The net effect is to leave the light p polarized. For example, assume the Faraday rotator 24 rotates the polarization of the beam through 45° about the propagation axis. The half-wave plate 26 is oriented such that the polarization of the light travelling to the right in FIG. 2a is rotated through an angle equal, but opposite in sign, to the rotation angle of the Faraday rotator, i.e.. −45°. Thus, the combination of the rotator and half-wave plate on light travelling from left to right in the picture has no effect on the polarization state of the light.

The beam then enters a conventional double pass amplification arm which includes a polarizer 28, laser amplifier 30, a quarter-wave plate 32, and a mirror 34. The p polarized light is transmitted by polarizer 28, propagates through the amplifier 30, to the quarter-wave plate 32 and reflects off of the mirror 34 back through the quarter-wave plate 32. The effect of the double transit of the beam through the quarter-wave plate 32 via the mirror 34 is to rotate the polarization of the beam so that it returns to the amplifier 30 with s polarization. The beam propagates through the amplifier 30 for a second time and, because it now has s polarization, is reflected by the polarizer 28 out to a second mirror 36. The s polarized light is retro-reflected back along the same path to the polarizer 28, and into the amplifier 30 for a third pass. After passing through the amplifier 30, the beam is passed through the quarter-wave plate 32, is reflected by the mirror 34 and back through the quarter-wave plate 32 so that the light has returned to p polarization for the fourth and (in this embodiment) final pass through the amplifier 30. This time, the left travelling p polarized beam is transmitted by polarizer 28 and continues to propagate towards the non-reciprocal optical grouping. With the beam travelling in this direction, the polarization rotations caused by the Faraday rotator 24 and half-wave plate 26 add together to cause a 90° rotation of the polarization vector such that the beam reaches polarizer 22 with s polarization. For example, assume the polarization vector of the beam is rotated through −45° by the wave plate 26. The Faraday rotator 24, however, rotates the polarization vector of the beam in a direction which is independent of the direction of propagation through the rotator 24. Thus, the rotator 24 will rotate a right travelling beam in the clockwise direction and a left travelling beam in the counter-clockwise direction. Therefore, the rotator 24 will rotate the polarization vector of the left travelling wave through −45°. The combined effect of the wave place 26 and rotator 24 is to rotate the polarization vector of the left travelling wave through −90° ((−45°)+(−45°)). The polarization vector of the left travelling wave at the first polarizer 22 is therefore orthogonal to the polarization vector of the right travelling wave when it first entered polarizer 22, and the beam is ejected by the polarizer 22 as output O.

The wave plate/rotator combination therefore acts like a direction-dependent half-wave plate between polarizers, with no rotation for right travelling beams and 90° rotation for left travelling beams. It is this property which provides the ability of the system shown to pass a beam collinearly four times through an optical element, such as a laser amplifier.

Figure 2B:
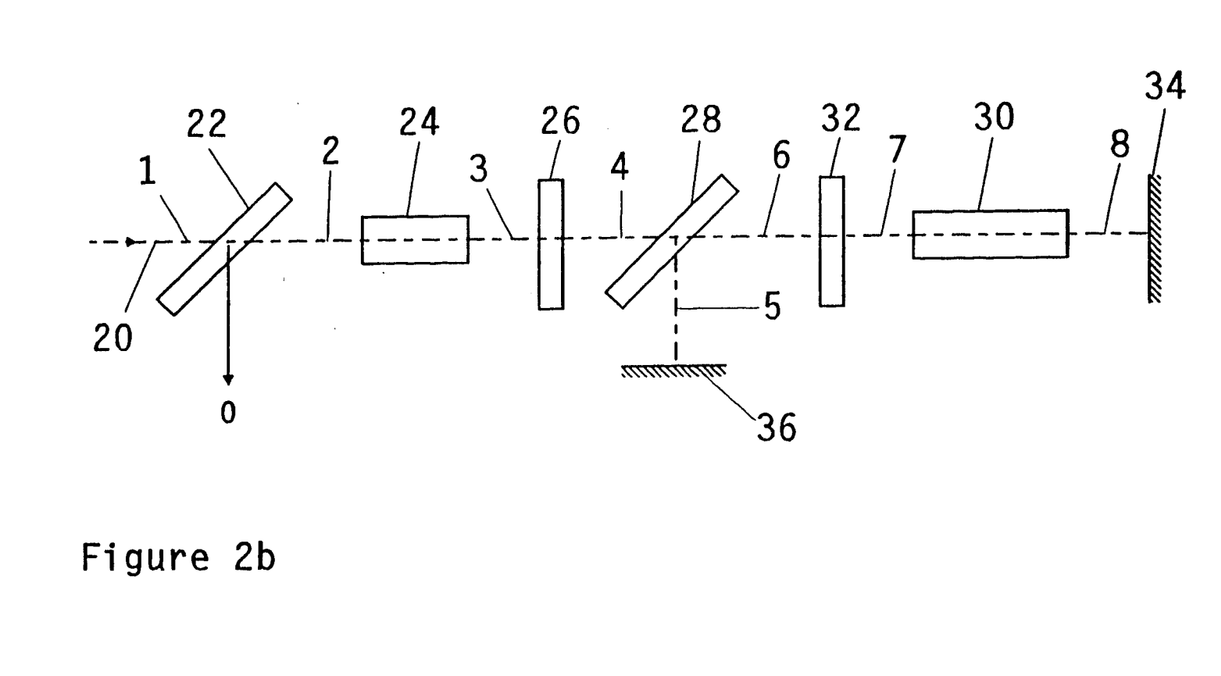

As will be appreciated by one of skill in the art from reading the foregoing, there is a certain degree of latitude in the orientation and positioning of the components for the four pass geometry described in FIG. 2a which does not affect the overall performance. For instance, polarizers 22 and 28 may be set at an angle of 45° relative to each other by rotation around the optical axis 20 in order to avoid the use of wave plate 26. The wave plate 26 maintains all incident and reflected beams in the same optical plane. In addition, the positioning of the amplifier 30, and the quarter-wave plate 32, may be interchanged, as depicted in FIG. 2b. In this case the light propagating through amplifier 30 is circularly polarized.

The system of FIG. 2b operates in essentially the same manner as the system of FIG. 2a. The non-reciprocal stage is the same as in FIG. 2a. The polarization state of each of points 1 to 8 in the quadruple pass system of FIG. 2b is shown in Table 1.

TABLE 1

Polarization state of the light at each numbered point in FIG. 2b ("circ" means the light is circularly polarized).

| | 1 | 2 | 3 | 4 | 5 | 6 | 7 | 8 |
|---|---|---|---|---|---|---|---|---|
| First Pass | 0 | 0 | 45° | 0 | | 0 | circ | circ |
| Second Pass | | | | | 90° | 90° | circ | circ |
| Third Pass | | | | | 90° | 90° | circ | circ |
| Fourth Pass | | −90° | −45° | 0 | | 0 | circ | circ |

Figure 2C:
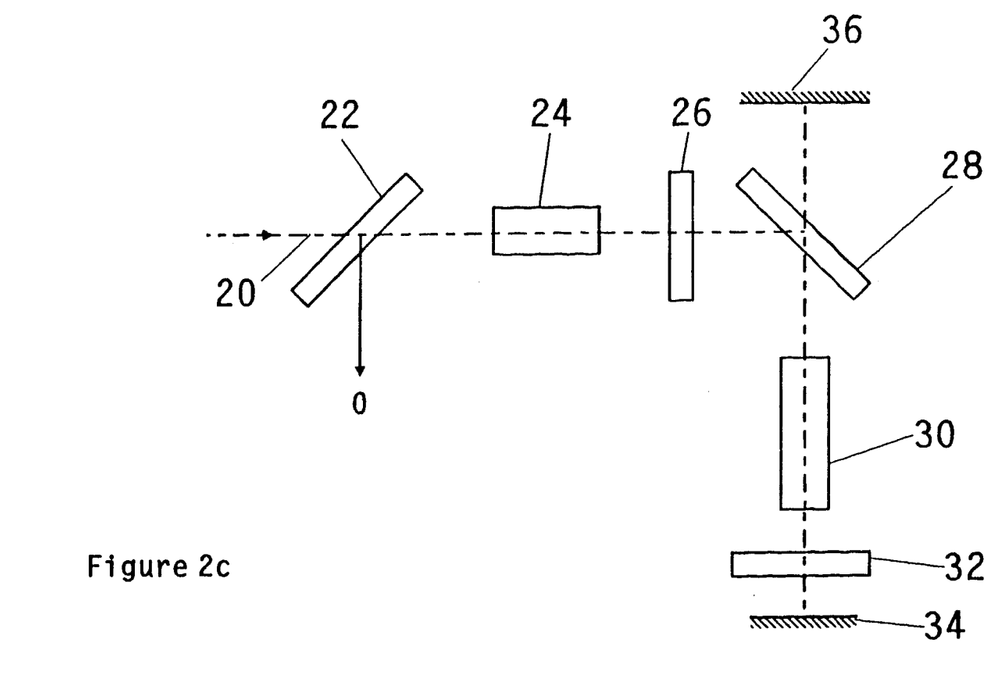
Figure 2D:
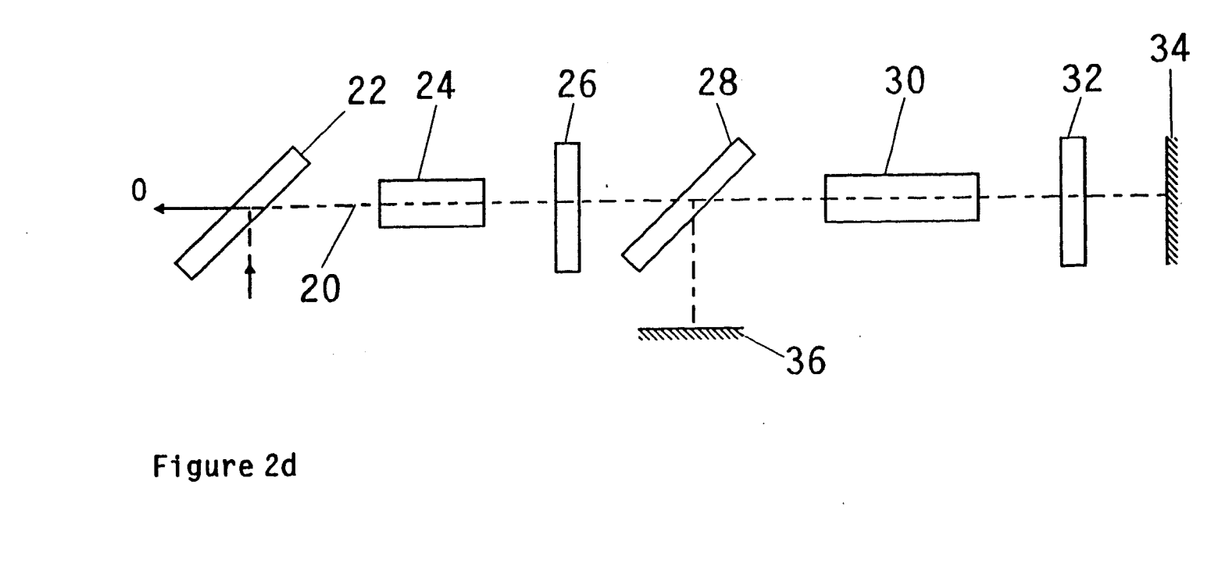

FIGS. 2a and 2b illustrate the case where the light is p polarized for the first illumination of both of the polarizers 22 and 28. As will now be apparent to one of skill in the art, other possibilities exist. For instance, in the embodiment of FIG. 2c, a p polarized light beam is incident on polarizer 22, which is oriented to transmit p polarized light in the direction of the optical axis of the rotator 24 while the polarizer 28 is oriented to reflect s polarized light in the direction of the optical axis of the amplifier 30. In this case, the non-reciprocal arm and amplifier arm are positioned at an angle (orthogonally in the embodiment illustrated) with respect to each other, with the retro-reflection mirror 36 being positioned along the optical axis of the amplifier arm. Alternatively, as illustrated in the embodiment of FIG. 2d, s polarized light is incident on the first polarizer 22, which is oriented to reflect p polarized light in the direction of the optical axis of the rotator 24, while the second polarizer 28 is oriented to transmit p polarized light. In this case, the output O is collinear with the optical axis of the non-reciprocal arm.

Figure 2E:
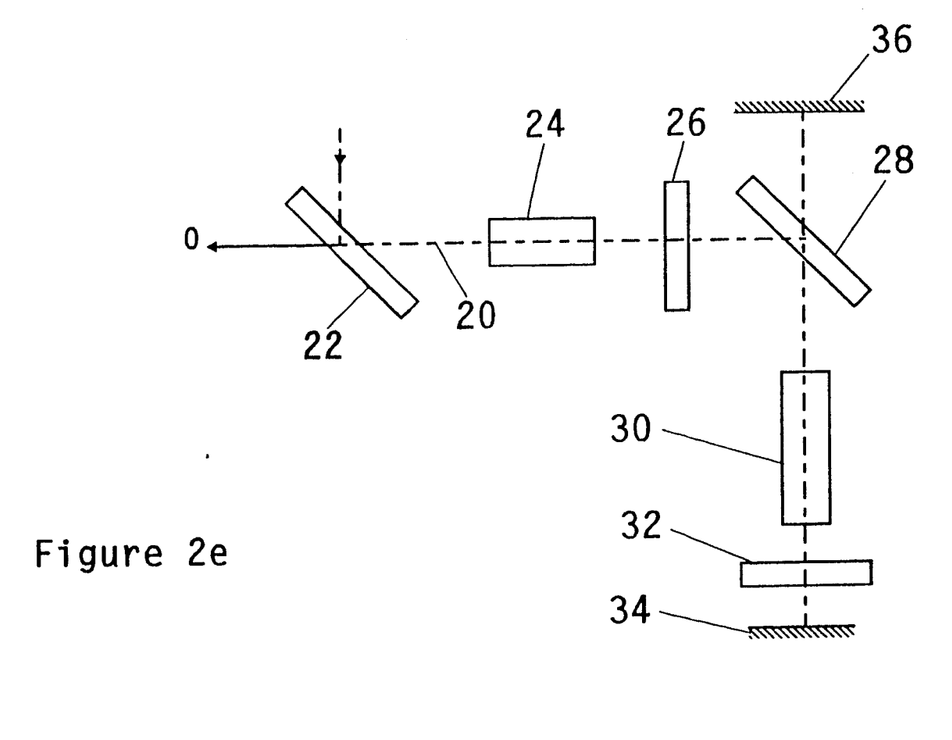

In the embodiment of FIG. 2e, s polarized light is incident on both the polarizer 22 and the polarizer 28, which are oriented to reflect s polarized light in the direction of the optical axis of the rotator 24 and amplifier 30, respectively. In this case, the output O is along the optical axis of the non-reciprocal arm, and the retro-reflection mirror 36 is along the axis of the amplifier arm. As will become apparent to the artisan on reading the above, the relative orientations of the Faraday rotator 24, and half-wave plate 26, must be correctly set, depending on the alignment of the polarizers 22 and 28.

As will be understood by the artisan upon reading the above, the total number of possible polarizer orientations is given by $2^{N+1}$ where N is the number of individual four pass sections present (or, as further explained below, the number of times a light beam is passed through a four-pass section) if one four-pass section is used (as in FIGS. 2a-2e), the number of combinations is $2^2$. If two four pass sections are used, as in FIG. 4, then the number of combinations is $2^3$.

Figure 3:
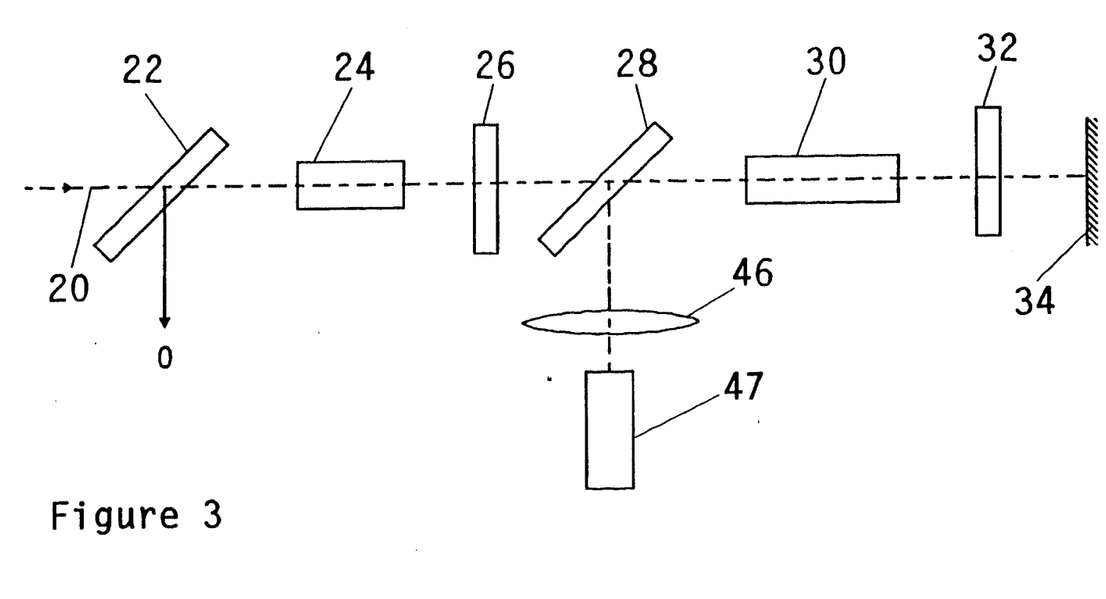
FIG. 3 is an optical circuit diagram of an embodiment of the invention which uses a non-linear mirror, or mirrors.

An alternate embodiment of the invention using a non-linear mirror, such as a stimulated Brilluoin scattering cell or a degenerate four-wave mixing cell, as a replacement of either, or both, mirrors 34 and 36, is illustrated in FIG. 3. The optical circuit diagram of FIG. 3 is similar to that of FIG. 2a, where mirror 36 has been replaced by a Brilluoin cell set up for reflecting a laser pulse. The lens 46, and the Brilluoin cell 47, form a nonlinear mirror which returns a phase conjugate beam, and thus helps to preserve a high quality wavefront on the amplified beam. In the embodiment illustrated, the reflected laser pulse may be compressed in duration relative to the pulse incident on the lens 46. In the case of the degenerate four-wave mixing cell, the element 47 represents the mixing cell and the lens 46 is optional.

It should be appreciated that the use of a non-linear mirror for either the mirror 36 or 34 (or both) can also be extended to the configurations of FIGS. 2b-2e, or other variations of the present invention, which the present description will suggest to the artisan.

Figure 4:
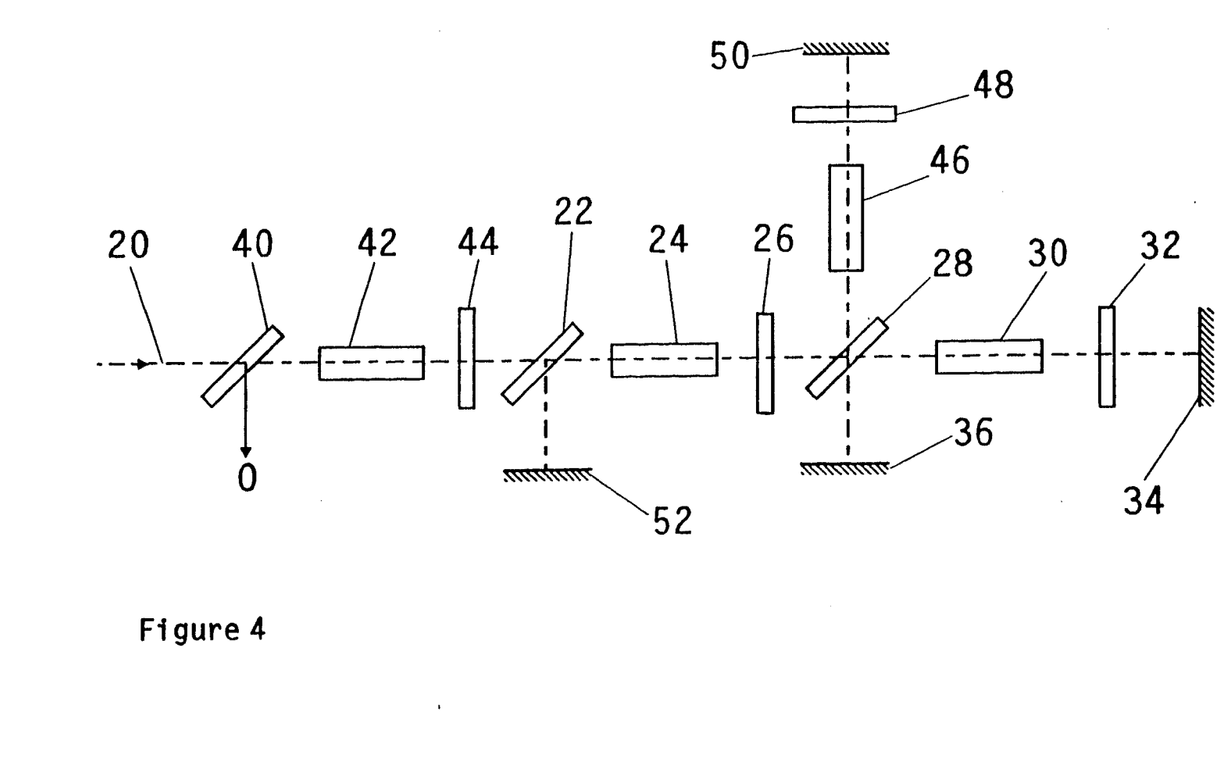
FIG. 4 is an optical circuit diagram of an embodiment of the invention illustrating a system for passing a light beam through multiple amplifiers.

A variation of the invention which illustrates the use of a second non-reciprocal optical arm to increase the number of passes through a double pass amplifier arm (to a multiple of four passes) is shown in FIG. 4. The major additional component added is the mirror 52 and its associated non-reciprocal optical grouping and a second double pass amplification arm, including an optical amplifier 46. The mirror 52 is positioned to reflect what was illustrated as the output O in FIG. 2a back along its original path in a collinear fashion. However, since the output O in FIG. 2a has s polarization, and since the combination of the Faraday rotator 24 and half-wave retardation plate 26 have no effect on the polarization state of light passing from left to right along the optical axis 20 of FIG. 4, the light reflected by the mirror 52 is reflected by polarizer 28 into the direction of a double pass amplification arm comprising a second optical amplifier 46, quarter-wave plate 48 and mirror 50 which is oriented at an angle, e.g. orthogonal in the illustrated embodiment, with respect to the optical axis 20. Thus, the light beam is double passed through amplifier 46, at which point the polarization of the light beam is p. Thus, the polarizer 28 transmits the double passed light beam, which reflects off the mirror 36 and is returned for a second double pass through amplifier 46. After the second double pass, the light beam has s polarization and is reflected to the left (as viewed in FIG. 4) by polarizer 28. Passage through the wave plate/Faraday rotator combination 26 and 24 rotates the left propagating light beam through 90° so that the light reaching polarizer 22 is p polarized and is thus transmitted. When the light reaches the additional non-reciprocal group, comprising a polarizer 40, Faraday rotator 42, and half-wave plate 44, the light is rotated through 90° again and reflected by the polarizer 40 out of the optical axis 20 as an output O in the direction shown in FIG. 4.

It is seen therefore that the use of an additional non-reciprocal group, comprising, for example, a polarizer, rotator and advantageously a half-wave retardation plate, allows the addition of a second four pass amplification stage using a second optical amplifier. As will now be appreciated by the artisan, additional non-reciprocal groups can be added to achieve additional four pass amplification stages. It should be appreciated that multiple four pass systems, such as the one illustrated in FIG. 4, can also be implemented with one or more nonlinear mirrors, or with combinations of other polarizer orientations, as illustrated in FIGS. 2c-2e.

A further embodiment of the present invention employs a single optical amplifier 30 for use in multiple four pass amplifications. This is illustrated, for example, in FIG. 5a, which depicts an arrangement similar to that depicted in FIG. 2a, but with the use of additional mirrors 54, 56, and 58, to direct the laser beam into the optical amplifier 30 which is also used in the first four-pass amplification arm. In the embodiment illustrated, during the second four-pass amplification using the optical amplifier 30, the light beam is directed through the optical amplifier 30 along a different optical axis than was used for the first four-pass amplification. This embodiment permits a single amplifier stage to be used in an eight pass situation without the use of active optical switches. As will be apparent to the artisan, additional four-pass amplification paths through the optical amplifier are also possible.

Figure 5A:
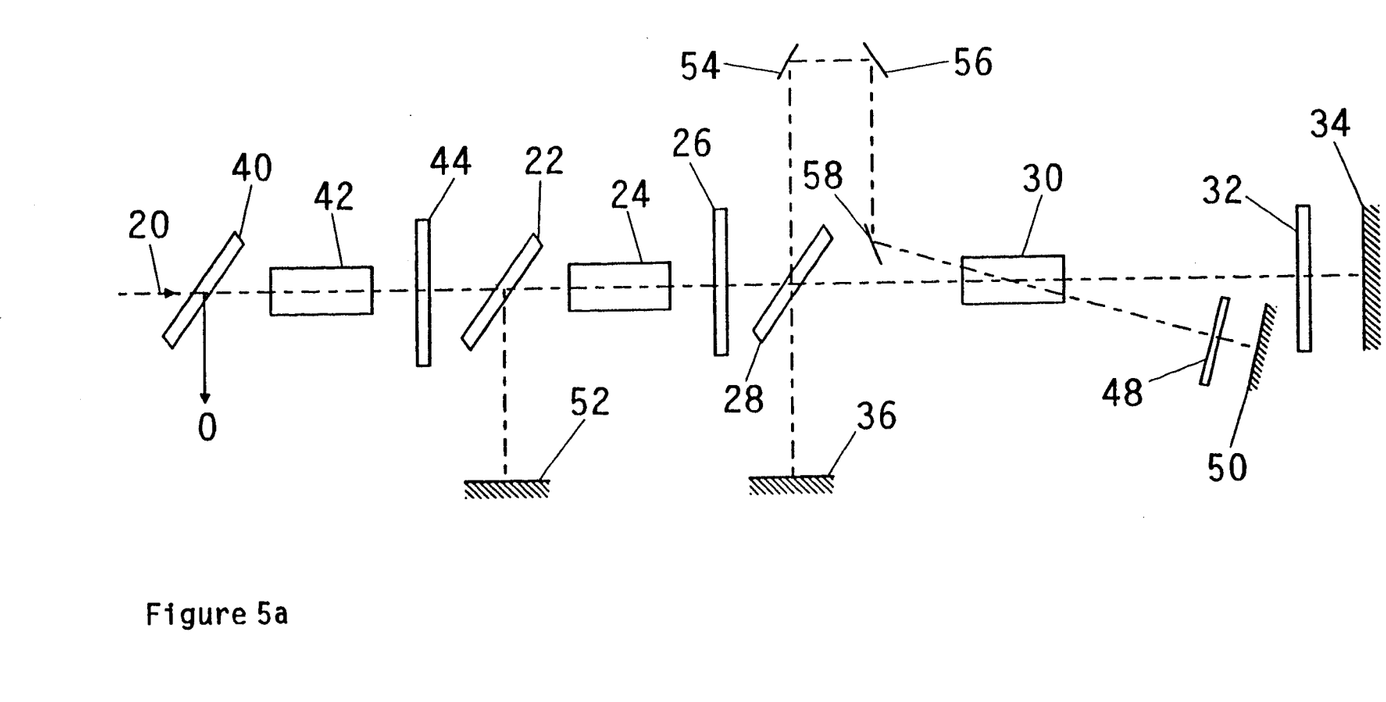
FIGS. 5a and 5b are optical circuit diagrams of embodiments of the invention in which a single amplifier is used for multiple four pass amplifications.
Figure 5B:
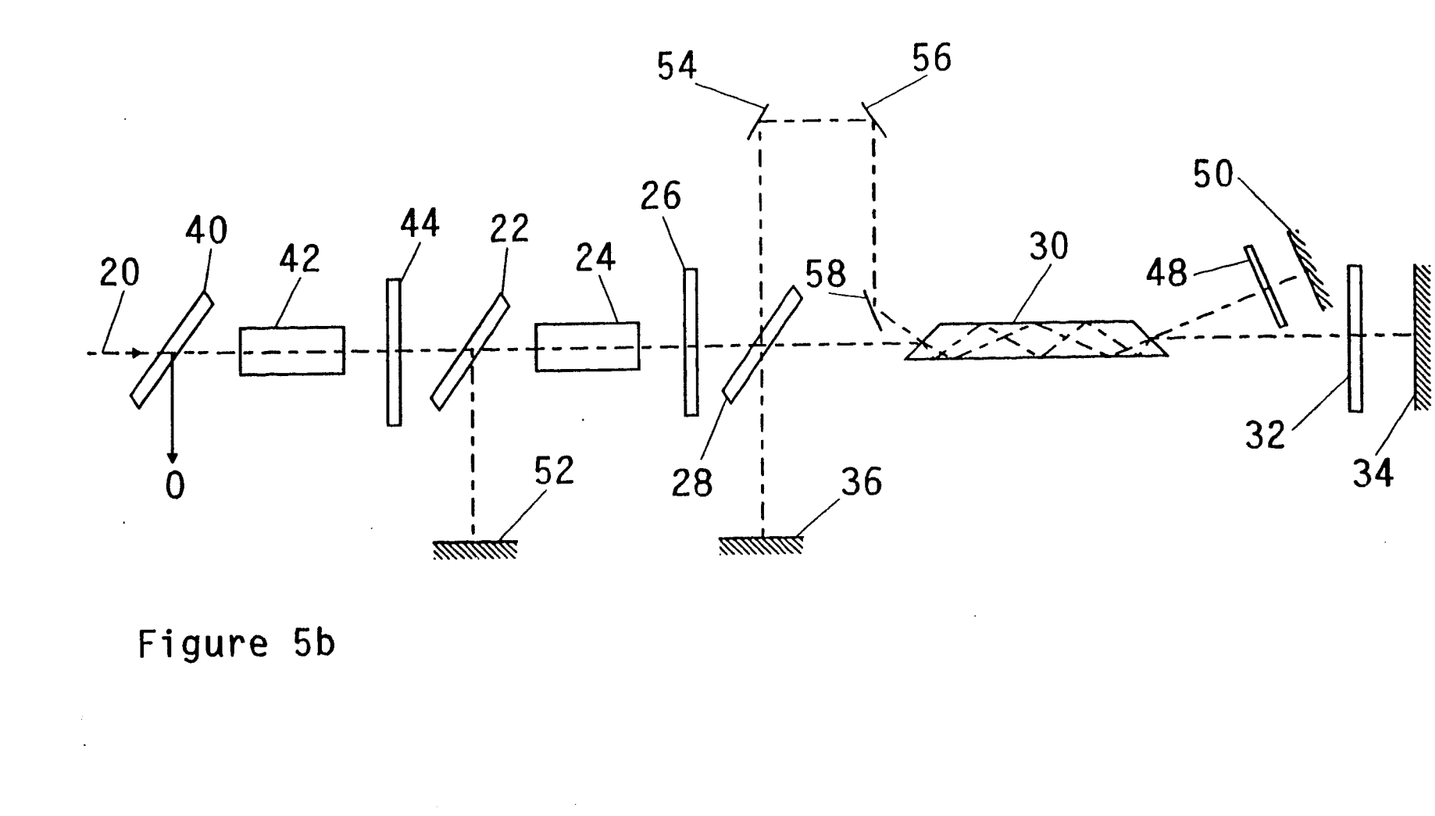

FIG. 5b illustrates a modification of the configuration of FIG. 5a, where the amplifier 30' is in the form of a slab, and the laser beam reflects multiple times within the slab on each pass due to total internal reflection or the presence of added reflective coatings. In this case, the number of reflections within the slab may be different for beams incident at different angles. At this point, no further detailed description of the optical path or the polarization state of the beam at each point in the optical path is warranted, as the artisan should now understand how to make and use such variations based on the principle of the invention described above.

A four-pass optical amplifier configured generally in accordance with that depicted in FIG. 2a was tested using a 5×5×60 mm slab of ND:YAG as the optical amplifier 30. The optical amplifier 30 was pumped using diode lasers emitting beams having a combined energy of 0.96 J over 200 µs. In order to reduce reflective losses at the entrance faces of the amplifier 30, it was Brewster angled for vertical polarization and the entrance faces were AR coated for horizontal polarization. The gain after the first, second and fourth stage of amplification for a 1.5 µJ, 200 ps input signal is given in Table 2.

The gain after four passes was measured to be around 1300. The difference between this measured gain and the idealized gain which would be expected from using four, cascaded single pass amplifier stages in a lossless system exhibiting no amplifier saturation, i.e., $8^4$, or about 4100, is believed to be due in part to saturation during the fourth pass and also to losses within the four-pass system.

Table 2

| Gain within four-pass geometry at various stages. | |
| --- | --- |
| Pass No. | Gain Factor |
| 1 | 8 |
| 2 | 60 |
| 4 | 1300 |

The foregoing description of the presently preferred embodiments of the invention have been presented for purposes of illustration and description. It is not intended to be exhaustive or to limit the invention to the precise forms disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

I claim:

1. A method of multi-passing a laser amplifier with a laser beam comprising the steps of:

directing a laser beam incident from a first direction at a non-reciprocal optical means having a first optical axis;

passing said beam through said non-reciprocal optical means and into an optical amplifier means having a second optical axis, said amplifier means including a non-reciprocal optical means including a reflecting means positioned on said second optical axis, whereby said beam is reflected back through said optical amplifier means for a second pass along said second optical axis;

separating the reflected beam from the beam incident on the optical amplifier means;

retro-reflecting the separated and reflected beam back along the second optical axis, whereby said beam passes through said amplifier means for a third pass to said reflecting means;

reflecting said beam back along said second optical axis through said optical amplifier means for a fourth pass;

directing said four-pass amplified beam through said non-reciprocal optical means; and outputting said amplified beam in a second direction which is not collinear with respect to said first direction.

2. The method according to claim 1, wherein said first direction is collinear with said first optical axis.

3. The method according to claim 1, wherein said first direction is at a non-zero angle with respect to said first optical axis.

4. The method according to claim 1, wherein the first optical axis and the second optical axis are collinear.

5. The method according to claim 1, wherein the first optical axis is at a non-zero angle with respect to the second optical axis.

6. The method according to claim 4, wherein said step of reflecting further comprises reflecting said beam using a mirror.

7. The method according to claim 5, wherein said step of reflecting further comprises reflecting said beam using a mirror.

8. The method according to claim 6, wherein said mirror is a non-linear mirror.

9. The method according to claim 7, wherein said mirror is a non-linear mirror.

10. The method according to claim 1, wherein said reflecting means includes a non-linear mirror.

11. The method according to claim 1, wherein the step of passing the beam through the non-reciprocal optical means includes rotating the beam through a first angle by passing the beam through a non-reciprocal rotator 12. The method according to claim 11, wherein the rotator is a Faraday rotator.

13. The method according to claim 11, wherein the step of passing the beam through the non-reciprocal optical means (24) further comprises the step of rotating the beam through an angle equal to the absolute value of said first angle by passing the beam through a reciprocal rotator element (26).

14. The method according to claim 1, wherein the optical amplifier (30) is positioned between the reflecting means (34) and another element (32) of said optical amplifier means.

15. The method according to claim 1, wherein said non-reciprocating optical means comprises a quarter-wave plate (32) and said reflecting means (34) is positioned on the second optical axis.

16. The method according to claim 1, wherein after the step of directing the beam through the non-reciprocal optical means, the method further comprises the steps of:

- reflecting the four-pass amplified beam back through the non-reciprocal optical means;
- double passing the four-pass amplified beam through a second optical amplifier means by means of a second non-reciprocal optical means, including a second reflecting means;
- retro-reflecting the beam back to said second optical amplifier;
- double passing said laser beam through said second optical amplifier means a second time, whereby said beam has passed through said second optical amplifier means four times; and
- passing the reflected amplified beam from said second optical amplifier means along said first optical axis to a second non-reciprocal optical group.

17. The method according to claim 1, wherein after the step of directing the beam through the non-reciprocal optical means, the method further comprises the steps of:

- separating the four-pass amplified beam from the first optical axis;
- retro-reflecting said separated, four-pass amplified beam back through said non-reciprocal optical means;
- further reflecting said beam back into said optical amplifier for a fifth pass; and
- reflecting said beam through said optical amplifier for a sixth pass.

18. The method according to claim 17, further comprising the steps of:

- retro-reflecting said six-pass amplified beam back to said optical amplifier a second time for a seventh pass; and
- reflecting said beam through said optical amplifier for an eighth pass.

19. The method according to claim 1, wherein said optical amplifier is selected from the group consisting of rod, disc and slab type optical amplifiers.

20. A multi-pass apparatus for amplifying an incident light beam comprising:

- a double pass optical amplification means, including an optical amplifier (30) positioned on a first optical axis;
- means (28, 36) for separating an amplified beam, which has been double passed through said optical amplifier from said incident beam and for retro-reflecting said double-passed amplified beam back to said double pass optical amplification means, whereby a beam propagating along said first optical axis is collinearly passed through said optical amplifier (30) four times;
- a non-reciprocal polarization rotating means having a non-reciprocal polarization rotating element (24) positioned on a second optical axis and a polarization means (22) for separating the four-pass amplified beam from the incident beam.

21. The apparatus according to claim 20, wherein said first optical axis is collinear with said second optical axis.

22. The apparatus according to claim 20, wherein said first optical axis is orthogonal with respect to said second optical axis.

23. The apparatus according to claim 20, wherein said first optical axis is non-collinear with respect to said second optical axis.

24. The apparatus according to claim 20, wherein said non-reciprocal polarization rotating element comprises a Faraday rotator.

25. The apparatus according to claim 20, wherein said non-reciprocal optical means further includes a reciprocal optical element (26).

26. The apparatus according to claim 25, wherein said reciprocal optical means comprises a half-wave retardation plate.

27. The apparatus according to claim 20, wherein said double pass optical amplification means further comprises a polarizer means (28) oriented to transmit light of a first polarity along said first optical axis.

28. The apparatus according to claim 20, wherein said double pass optical amplification means further comprises a polarizer means (28) oriented to reflect light of a first polarity along said first optical axis.

29. The apparatus according to claim 20, wherein the polarizer means (22) of said non-reciprocal optical means is oriented to transmit incident light of a first polarity along said second optical axis.

30. The apparatus according to claim 20, wherein the polarizer means (22) of said non-reciprocal optical means is oriented to reflect incident light of a first polarity along said second optical axis.

31. The apparatus according to claim 20, wherein said double pass optical amplification means further comprises a non-reciprocal polarization rotating means (32, 34).

32. The apparatus according to claim 31, wherein said non-reciprocal polarization rotating means comprises a reflector (34) and a polarization rotating means (32) positioned along said first optical axis, and wherein said means for separating comprises a polarizer means (28) positioned along said first optical axis.

33. The apparatus according to claim 32, wherein the polarization rotating means comprises a circular or elliptical polarization means.

34. The apparatus according to claim 32, wherein the polarization rotating means comprises a quarter-wave retardation plate.

35. The apparatus according to claim 20, wherein said means for retro-reflecting comprises a mirror.

36. The apparatus according to claim 20, wherein said means for retro-reflecting comprises a non-linear mirror.

37. The apparatus according to claim 36, wherein said non-linear mirror comprises a degenerate four-wave mixing cell.

38. The apparatus according to claim 36, wherein said non-linear mirror comprises a stimulated Brilluoin scattering cell.

39. The apparatus according to claim 32, wherein the reflector comprises a mirror.

40. The apparatus according to claim 32, wherein the reflector comprises a non-linear mirror.

41. The apparatus according to claim 40, wherein the non-linear mirror is selected from the group comprising a stimulated Brilluoin scattering cell and a degenerate four-wave mixing cell.

42. The apparatus according to claim 20, further comprising:

- a second double pass optical amplification means including a second optical amplifier positioned on a third optical axis;
- and a second non-reciprocal polarization rotating means, oriented to receive and reflect a beam reflected from said first-mentioned non-reciprocal polarization altering means, whereby a beam, after passing collinearly two times through said first-mentioned double pass optical amplification means is redirected back to the second double pass optical amplification means.

43. The apparatus according to claim 42, wherein said means for retro-reflecting a double-passed beam further retro-reflects the beam from said second double pass optical amplification means back along said third axis, whereby said optical beam traverses said second optical amplifier four times.

44. The apparatus according to claim 43, wherein said second double pass optical amplification means further comprises a reflector and polarization rotating means positioned along said third optical axis.

45. The apparatus according to claim 44, wherein said polarization rotating means comprises a quarter-wave retardation plate.

46. The apparatus according to claim 42, wherein said second non-reciprocal polarization rotating means comprises a second non-reciprocal optical element positioned on a fourth optical axis.

47. The apparatus according to claim 46, wherein said second non-reciprocal polarization rotating means further comprises a reciprocal optical element positioned on said fourth optical axis.

48. The apparatus according to claim 47, wherein said non-reciprocal optical element comprises a Faraday rotator and said reciprocal optical element comprises a half-wave retardation plate.

49. The apparatus according to claim 47, wherein said second non-reciprocal polarization rotating means further comprises a polarizer positioned on said fourth optical axis.

50. The apparatus according to claim 46, wherein said second optical axis and said fourth optical axis are collinear.

51. The apparatus according to claim 42, further comprising a reflecting means positioned to receive the output of said first non-reciprocal polarization rotating means and retro-reflect said output back along said second optical axis.

52. The apparatus according to claim 20, further comprising:
reflecting means for directing a beam through said double pass amplification means along a fifth optical axis; and
a second non-reciprocal polarization rotating means oriented to receive and reflect a beam reflected from said first-mentioned non-reciprocal polarization altering means, whereby a beam, after passing collinearly two times through said double pass optical amplification means, is redirected back to said double pass optical amplification means along said fifth optical axis.

53. The apparatus according to claim 52, wherein said fifth optical axis and said first optical axis are non-collinear.

54. The apparatus according to claim 52, wherein each of said fifth optical axis and said first optical axis pass through said optical amplifier but are not parallel to each other.

55. The apparatus according to claim 52, wherein said fifth optical axis and said first optical axis pass through said optical amplifier and are parallel to each other.

56. The apparatus according to claim 52, wherein said reflecting means comprises a plurality of mirrors oriented to receive said beam after passing through said double pass optical amplification means and redirect it along said fifth optical axis.

57. The apparatus according to claim 52, wherein said second non-reciprocal polarization rotating means comprises a second non-reciprocal optical element positioned on a fourth optical axis.

58. The apparatus according to claim 57, wherein said second non-reciprocal polarization rotating means further comprises a reciprocal optical element positioned on said fourth optical axis.

59. The apparatus according to claim 58, wherein said non-reciprocal optical element comprises a Faraday rotator and said reciprocal optical element comprises a half-wave retardation plate.

60. The apparatus according to claim 57, wherein said second non-reciprocal polarization rotating means further comprises a polarizer positioned on said fourth optical axis.

61. The apparatus according to claim 57, wherein said second optical axis and said fourth optical axis are collinear.

62. The apparatus according to claim 52, further comprising a reflecting means positioned to receive the output of said first non-reciprocal polarization rotating means and retro-reflect said output back along said second optical axis.

63. The apparatus according to claim 20, wherein said optical amplifier has a rod-shaped geometry.

64. The apparatus according to claim 20, wherein said optical amplifier has a disc-shaped geometry.

65. The apparatus according to claim 20, wherein said optical amplifier has a slab-shaped geometry.

* * * * *